(12) United States Patent
Wagner et al.

(10) Patent No.: US 11,524,779 B2
(45) Date of Patent: Dec. 13, 2022

(54) AIRCRAFT FOR TAKE OFF AND LANDING ON WATER AND ON LAND

(71) Applicant: DORNIER NO LIMITS GMBH, Munich (DE)

(72) Inventors: Wolfgang Helmut Wagner, Friedrichshafen (DE); Irene Prosper Heinrich Dornier, Munich (DE)

(73) Assignee: DORNIER NO LIMITS GMBH, Munich (DE)

( * ) Notice: Subject to any disclaimer, the term of this patent is extended or adjusted under 35 U.S.C. 154(b) by 1092 days.

(21) Appl. No.: 16/145,542

(22) Filed: Sep. 28, 2018

(65) Prior Publication Data

US 2019/0092463 A1 Mar. 28, 2019

(30) Foreign Application Priority Data

Sep. 28, 2017 (DE) ...................... 10 2017 122 617.6

(51) Int. Cl.
| | |
|---|---|
| *B64C 35/00* | (2006.01) |
| *B64C 25/54* | (2006.01) |
| *B64C 25/60* | (2006.01) |
| *B64F 5/10* | (2017.01) |
| *B60F 3/00* | (2006.01) |

(Continued)

(52) U.S. Cl.
CPC .......... *B64C 35/008* (2013.01); *B60F 3/0038* (2013.01); *B60F 5/003* (2013.01); *B64C 25/34* (2013.01); *B64C 25/54* (2013.01); *B64C 25/60* (2013.01); *B64F 5/10* (2017.01)

(58) Field of Classification Search
CPC ......... B64C 25/54; B64C 25/56; B64C 25/66; B64C 35/00; B64C 35/008; B60F 5/003
See application file for complete search history.

(56) References Cited

U.S. PATENT DOCUMENTS

| | | | | |
|---|---|---|---|---|
| 3,790,109 A | * | 2/1974 | Fischer | .................. B64C 35/00 244/105 |
| 6,866,224 B2 | * | 3/2005 | Smith | ..................... B64C 25/16 244/101 |

(Continued)

FOREIGN PATENT DOCUMENTS

| | | |
|---|---|---|
| CN | 101678895 A | 3/2010 |
| JP | 2006224686 A | 8/2006 |

(Continued)

OTHER PUBLICATIONS

Office Action in connection to Chinese Application No. 201811122587.8, dated Dec. 21, 2021.

(Continued)

*Primary Examiner* — Nicholas McFall

(74) *Attorney, Agent, or Firm* — Meunier Carlin & Curfman LLC

(57) ABSTRACT

The invention relates to an aircraft for takeoff and landing on water or on land. The aircraft comprises a fuselage and a spring-mounted landing gear. Landing gear wheels are mountable on the landing gear for takeoff and landing on land. Furthermore, the aircraft comprises a floating device coupleable to the landing gear of the aircraft via a connecting device. The floating device is configured such that the hydrostatic lifting force of the floating device is greater than the maximum takeoff weight of the aircraft.

19 Claims, 7 Drawing Sheets

(51) Int. Cl.
*B60F 5/00* (2006.01)
*B64C 25/34* (2006.01)

(56) References Cited

U.S. PATENT DOCUMENTS

| | | |
|---|---|---|
| 2013/0075538 A1 | 3/2013 | Wiplinger |
| 2014/0021296 A1 | 1/2014 | Custard |
| 2014/0339359 A1 | 11/2014 | Jeute |

FOREIGN PATENT DOCUMENTS

| | | |
|---|---|---|
| JP | 201064697 A | 3/2010 |
| WO | WO 2008/089511 A1 | 7/2008 |

OTHER PUBLICATIONS

German Patent Application No. 10 2017 122 617.6, Search Report dated Aug. 30, 2018.

* cited by examiner

AIRCRAFT FOR TAKE OFF AND LANDING ON WATER AND ON LAND

CROSS REFERENCE TO RELATED APPLICATION

This application claims priority to and benefit of German patent application DE 10 2017 122 617.6 filed Sep. 28, 2017, which is fully incorporated by reference and made a part hereto.

FIELD OF THE INVENTION

The invention relates to an aircraft for takeoff and landing on water and on land, a method for converting an aircraft into a seaplane, and use of an aircraft for takeoff and landing on water and on land.

STATE OF THE ART

In the State of the Art aircrafts which can take off from the water and/or land on the water are known. Hence, for example, aircrafts can comprise a boat-shaped and boat-like fuselage, which permits landing on and take off from water for the aircraft, and which provides at least part of the hydrostatic lift on the water. Aircrafts can also be provided with floating bodies.

Often, landplanes are converted into seaplanes by the adaptation of floating bodies. In particular, smaller aircrafts, such as, for example, light aircrafts or single-engined aircrafts, can often be converted by means of conversion kits in order to take off from and land on water. But the conversion by adaptation of floating bodies often has the disadvantage that the convertibility is limited by the size of the aircraft.

Moreover, landplanes, in particular medium-sized and large landplanes, are often not suitable to be operated on water. Often, waves and swells cause forces which would exceed the authorized load limits of the landplane. For example, the wings or the engine and the engine mount structure can be affected by it. Also, accelerations, which act on the tail unit when operating the aircraft on water, can be outside the values determined in the base certification. Therefore, it must be guaranteed that the limit values defined in the base certification, such as, for example, accelerations, center of gravity and local limit loads are not exceeded. But the design of aircrafts withstanding these loads is often complex. Therefore, it can result in high development cost and/or high certification cost.

DISCLOSURE OF THE INVENTION

It is the objective of the invention to solve at least partly the problems of the State of the Art. In particular, it is the objective of the invention to provide an aircraft which can be easily and/or cost-effectively converted into an aircraft that can take off from and land on water or land.

The objective is achieved with the aircraft according to patent claim 1, the method according to patent claim 15 and a use according to the dependent patent claim 17.

One aspect of the present disclosure relates to an aircraft for takeoff and landing on water or land. The term "aircraft" in the present disclosure designates in particular aircrafts heavier than air, wherein the aircraft generates the lift required for flying by non-rotating lifting surfaces.

In typical embodiments of the present disclosure the aircraft according to the present disclosure comprises an airframe, an engine unit and a landing gear. In typical embodiments the landing gear is realized as a retractable landing gear. In other typical embodiments the landing gear can, for example, also be realized as a fixed or as a semi-fixed landing gear. The term "fixed" and/or "semi-fixed" has to be understood here as non retractable and/or only partly retractable.

In typical embodiments the engine unit of the aircraft comprises one or several motors. As motors, for example, piston engines, gas turbines, turboprop engines or jet engines, such as, for example, a turbofan, can be used. Aircrafts according to the present disclosure, however, are not limited to motors with combustion force systems. In embodiments, for example, an electric motor can be used as an engine unit.

A typical aircraft, which can be converted into an aircraft for takeoff and landing on water and on land according to the present disclosure, is, for example, the aircraft of the aircraft type "Dornier Do 328". Other exemplary aircrafts are those of the aircraft type "ATR 42" or "ATR 72". Other aircraft types, which can be used for typical embodiments of the present disclosure, often have similar features to the above mentioned features. But aircrafts to be converted are not limited to the above mentioned aircraft types. Hence, a suitable aircraft of another type can be used as long as it meets the respective requirements, such as, for example, certification requirements after conversion.

The aircraft of the present disclosure typically comprises a fuselage. In a typical embodiment the wings of the aircraft can substantially be located flush with the top edge of the fuselage.

The aircraft for takeoff and landing on water or land of the present disclosure has in particular a spring-mounted landing gear. The landing gear can, for example, be configured as a landing gear realized as a main landing gear and a nose landing gear. On the landing gear, landing gear wheels for takeoff and landing on land can be mountable. Typically, the landing gear wheels are mountable on the landing gear axes. The suspension of the landing gear can, for example, absorb the forces occurring during landing or take off. In particular, the suspension of the landing gear can absorb forces in the direction of the Z-axis (vertical axis).

In typical embodiments of the present disclosure the aircraft comprises a floating device. The floating device is configured such that the hydrostatic lifting force of the floating device is greater than the maximum take-off weight of the aircraft. This means that the aircraft according to this embodiment can float on a water surface. In particular, the substantial part of the water displacement can exclusively be provided by the floating device.

Moreover, in typical embodiments the aircraft comprises a connecting device. Via the connecting device the floating device can be coupled to the landing gear of the aircraft. The coupling of the floating device to the landing gear of the aircraft via the connecting device can be made by means of loads and/or shape mechanisms. In typical embodiments of the aircraft with coupled floating device, the wheels mountable on the axes of the landing gear are removed. The connecting device of the present disclosure can in particular permit a rapid and/or particularly simple fixation of a floating device to an aircraft equipped with landing gear. By this, for example, an aircraft with landing gear and landing gear wheels for takeoff and landing on land can be converted in a simple manner into an aircraft for takeoff and landing on water.

If the aircraft has a retractable landing gear and the landing gear is to the floating device, the landing gear is extended and fixed in typical embodiments. This means that in the case of coupled floating device the retractable landing gear is not retractable.

Furthermore, by the coupling described herein the floating device can be removed again in a simple manner. The rebuildability of the aircraft into an aircraft with landing gear wheels for exclusive takeoff and landing on land is thus easily possible.

The coupling of the floating device to the landing gear of the aircraft has in particular the advantage that by the typical suspension of the landing gears also the floating device is spring-mounted. In particular, an already existing damping of the landing gears in Z-axis direction (vertical axis) can be used for the suspension of the floating device. Hence, forces occurring during takeoff and/or landing on water and acting on the floating device can be absorbed by the suspension of the landing gears. Thus, the load on the aircraft structure, such as, for example, on the wings, on the engine units or on the engine unit mount structures can be reduced.

For example, the floating device can comprise several coupling points to which a connecting device each can be coupled. In particular, the floating device can comprise a coupling point for each landing gear axis of the landing gear. For example, the floating device can comprise two coupling points for a main landing gear, which comprises two landing gear legs, and one coupling point for a nose landing gear with one landing gear leg. In this example one connecting device each can be connected with one of the coupling points. The respective connecting device connected with the coupling point can then be coupled to the respective landing gear leg.

In typical embodiments in particular the fixing of the floating device can be made on the axes of the landing gear. The axes of the landing gear herein designates the axes on which the landing gear wheels are mountable. Typically, the landing gear wheels are removed prior to coupling of the floating device with the landing gear.

In further typical embodiments of the present disclosure, the connecting device can moreover comprise a distance setting device. The distance setting device is typically adapted to set a distance of at least a part of the floating device with respect to the fuselage. For example, adjusting elements can be mounted as the distance setting device on structural points provided for the landing gear fixing.

The distance setting device typically comprises an actuator which converts signals such as, for example, electric signals into mechanical movement. The actuator can typically be controlled during the operation of the aircraft. Typically, the distance can be set by means of the actuator via one or several electric motors such as, for example, servomotors. In other typical embodiments the actuator is a hydraulic or pneumatic actuator.

Via the distance setting device, the distance between the fuselage of the aircraft and the floating device can be increased or reduced. Hence, for example, on takeoff the distance of the engine with respect to the waterline can be increased. A greater distance on takeoff can reduce the penetration of splash water into the engine. A reduction of the distance in flight mode of the aircraft, however, can improve the aerodynamic profile of the aircraft. The flow resistance of the aircraft can thus be reduced.

Further typical embodiments of the present disclosure, which can be combined with other typical embodiments, relate in particular to an aircraft on which the floating device is set up to conform itself to the fuselage at least partly or at least substantially at a minimum distance set with the distance setting device.

The term "conform to" and/or "to conform to" designates in the present disclosure a property of the floating device described more in detail below. The floating device can, for example, be realized in such a manner that the inside of the floating device facing the fuselage comprises a substantially complementary form with respect to the fuselage. By the conforming shape of the floating device, a distance between the floating device and the fuselage can, for example, be minimized. As a result, the flow resistance in flight mode of the aircraft can be reduced further.

In typical embodiments of the present disclosure the floating device can have a substantially streamlined shape. The term "streamlined" designates in the present disclosure that the shape of a body is characterized by streamlined sophistication, with little flow resistance. Typically, the streamlined shape has a pattern of the streamlines as smooth and non-turbulent as possible. In this configuration, for example, the aerodynamic resistance as well as disturbing moments around the vertical axis can be minimized.

In other typical embodiments the floating device comprises a boat geometry with sponson. The sponson is typically realized similar to the known sponsons which, for example, are used in many flying boats of the manufacturer "Dornier". The sponsons can, for example, be used as a rescue platform or as a work platform. The sponsons can also increase stabilization of the aircraft on the water surface. This is particularly advantageous at high waves. Typically, the sponsons can be realized in such a manner that they increase the lift of the floating device.

In typical embodiments the floating device can comprise a step. The step is located at the underside, at a rear section of the floating device. The step is typically realized in such a manner that the transition to low-resistance sliding occurring during takeoff from water is facilitated. In typical embodiments the step can permit easier takeoff from water. In particular, the step facilitates during takeoff the detachment of the floating device from the water surface. Typically, the step has an adequate distance to the center line of gravity.

By the conforming shape of the floating device described above, the floating device can, for example, partly encompass the fuselage in typical embodiments. At a minimum distance set by the distance setting device the floating device can, for example, partly encompass the fuselage. This means that the floating device conforms itself to the fuselage of the aircraft. If the distance is increased to a predetermined value by the distance setting device, the floating device does no longer conform itself to the fuselage of the aircraft.

In typical embodiments of the present disclosure, which can be combined with other typical embodiments, the landing gear and/or the floating device can comprise a damping. The damping can, for example, be made by means of damping elements such as, for example, suspension elements, buffer elements, shock absorbers, gas springs, hydraulic cylinders, hydropneumatic cylinders or the like.

In typical embodiments, for example, loads in Z-direction can be dampened by means of damping elements integrated into the landing gear. In other typical embodiments loads in X-direction (longitudinal axis) and/or Y-direction (transverse axis) can be reduced by means of damping elements provided in the floating device. In typical embodiments, for example, the distance setting device can comprise a damping element so that loads during takeoff and/or landing can be compensated. By an appropriate selection of the damping, the load on the structural points of the aircraft can be maintained in an admissible range.

In typical embodiments the damping elements provided in the floating device can be realized as an active damping. For example, the damping elements for reducing the loads in X-direction and/or the damping elements for reducing the loads in Y-direction can be realized as an active damping. An active damping designates here a damping, wherein components of the damping, such as, for example, damping elements, adjust themselves to an external condition to be dampened.

In typical embodiments of the present disclosure the distance setting device realized as a damping element can be configured moreover in such a manner that via the distance setting device relative movements between the aircraft and the floating device are possible. In particular, the distance setting device can be equipped with so many degrees of freedom that relative movements in X-direction and/or Y-direction can be adjusted in said embodiment. For example, the floating device can in this way be shifted relative to the center of gravity in X-direction and/or in Y-direction. This means that the damping element can be designed in such a manner that the floating device can be moved along the longitudinal axis and/or the transverse axis of the aircraft. By this, for example, the hydrodynamic behavior of the aircraft during takeoff from and landing on water can be optimized.

In typical embodiments hinged supports can be attached on the distance setting device of the aircraft.

In further embodiments of the present disclosure the floating device can be equipped for amphibious operation. In the floating device, for example, a landing gear can be integrated which can be extended or folded out for landing on land. For landing on water the landing gear integrated into the floating device can be retracted and/or folded up.

In other embodiments the floating device is exclusively coupled to the landing gear of the aircraft via the connecting device.

Another aspect of the present disclosure relates to a method for converting an aircraft into a seaplane, in particular for converting an aircraft according to any one of the embodiments described herein. The method comprises the coupling of a floating device to the landing gear of the aircraft via a connecting device.

In embodiments of the present disclosure the method comprises an adjustment of a distance of at least a part of the floating device with respect to the fuselage via a distance setting device of the connecting device.

In other embodiments the method comprises the adjustment of the distance so that the floating device that can at least partly conform itself to the fuselage at least partly or at least substantially conforms itself to the fuselage of the aircraft.

Another aspect of the present disclosure relates to the use of an aircraft according to any one of the embodiments described herein for takeoff and landing on water and on land.

BRIEF DESCRIPTION OF THE FIGURES

Hereinafter the invention is explained by means of the following figures, wherein the invention, however, is not limited to the embodiments shown in the figures.

DESCRIPTION OF EMBODIMENTS

Figure 1:
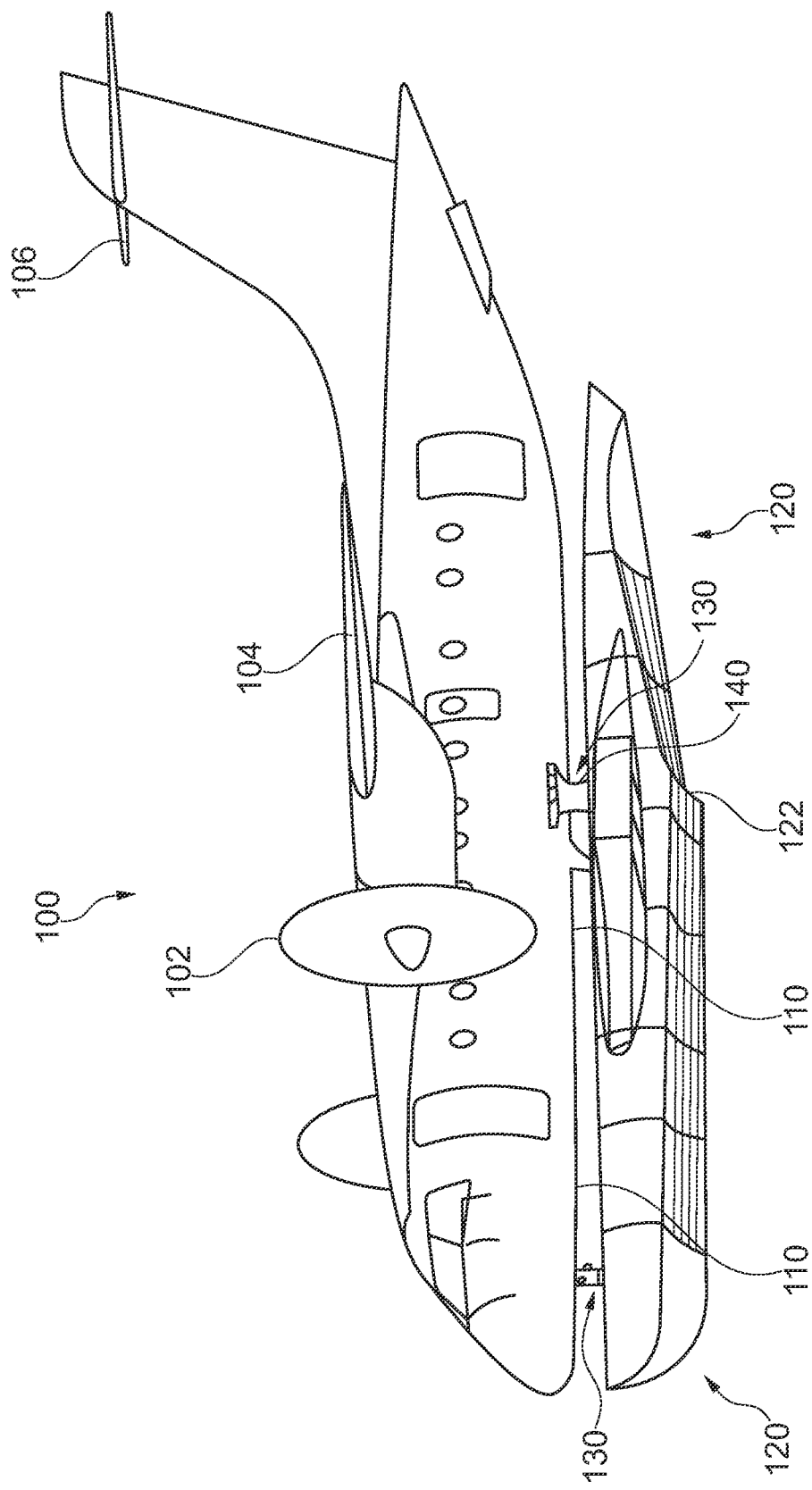
FIG. 1 shows a schematic side view of an aircraft with floating device according to a first embodiment.

Reference is now made in detail to the different embodiments of the disclosure, wherein one or several examples are shown in the figures. In the following description of the drawings the same reference numerals refer to the same components. In general only the differences to individual embodiments are described. Each example serves for explanation of the disclosure and is not intended as a restriction of the disclosure. Moreover, features which are shown or described as part of an embodiment can be used in or in connection with other embodiments in order to yield still a further embodiment. It is intended that the description contains such modifications and variations.

FIG. 1 shows an aircraft 100 with a fuselage 110. The aircraft 100 comprises on each side of the fuselage 110 one wing halve each of the wings 104. The reference numeral 106 designates a part of the tail unit of the aircraft 100. Engine units 102 are located on each one of the wing halves. The engine units 102 are realized in FIG. 1 as a turboprop.

Moreover, the aircraft 100 comprises a landing gear 130. The landing gear 130 comprises a nose landing gear which is located at the nose of the aircraft 100, and a main landing gear. The main landing gear according the embodiment shown in FIG. 1 comprises a left and a right landing gear leg.

Moreover, the aircraft 100 of FIG. 1 comprises a floating device 120. The floating device 120 is coupled to the landing gear 130 of the aircraft 100 by means of a connecting device 140. In particular, the nose landing gear of the aircraft 100 is coupled to a coupling point at the nose of the floating device 120 via the connecting device 140. The left and the right landing gear leg of the main landing gear of the landing gear 130 is in each case coupled to another coupling point of the floating device 120 via the connecting device 140.

As an illustrative example of the present disclosure, the base body of the aircraft 100 is realized in the embodiment shown in FIG. 1 as a Dornier Do 328. It is the aircraft body of an aircraft, which is designated as a base body here, and which shall be converted into an aircraft for takeoff and landing on water and on land according to the present disclosure.

The floating device 120 is configured in such a manner that the hydrostatic lift required for operating the aircraft 100 on water is provided by the floating device 120. Furthermore, the floating device has a boat-shaped shape in the embodiment of FIG. 1. This can, for example, include a streamlined floating device nose on the front part of the fuselage of the floating device.

Moreover, the floating device 120 typically has a step 122. The step 122 typically facilitates the detachment of the floating device from the water surface during takeoff of the aircraft 100.

Figure 2A:
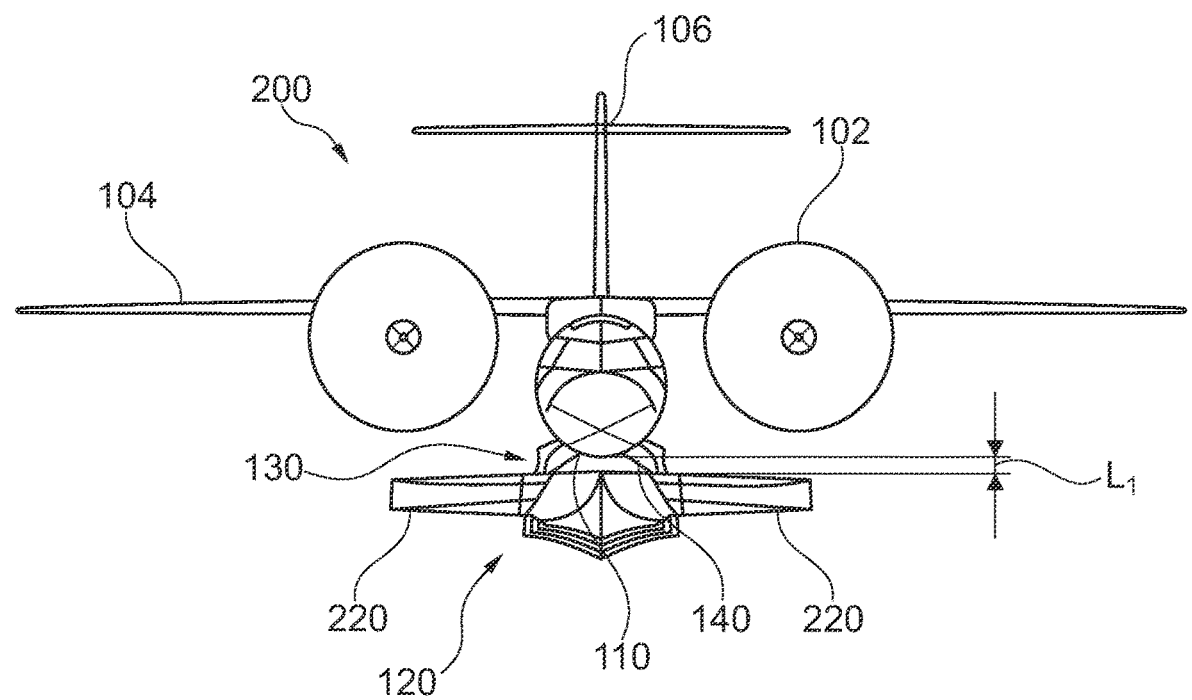
FIG. 2A and FIG. 2B show schematic front views of an aircraft with floating device according to a second embodiment.
Figure 2B:
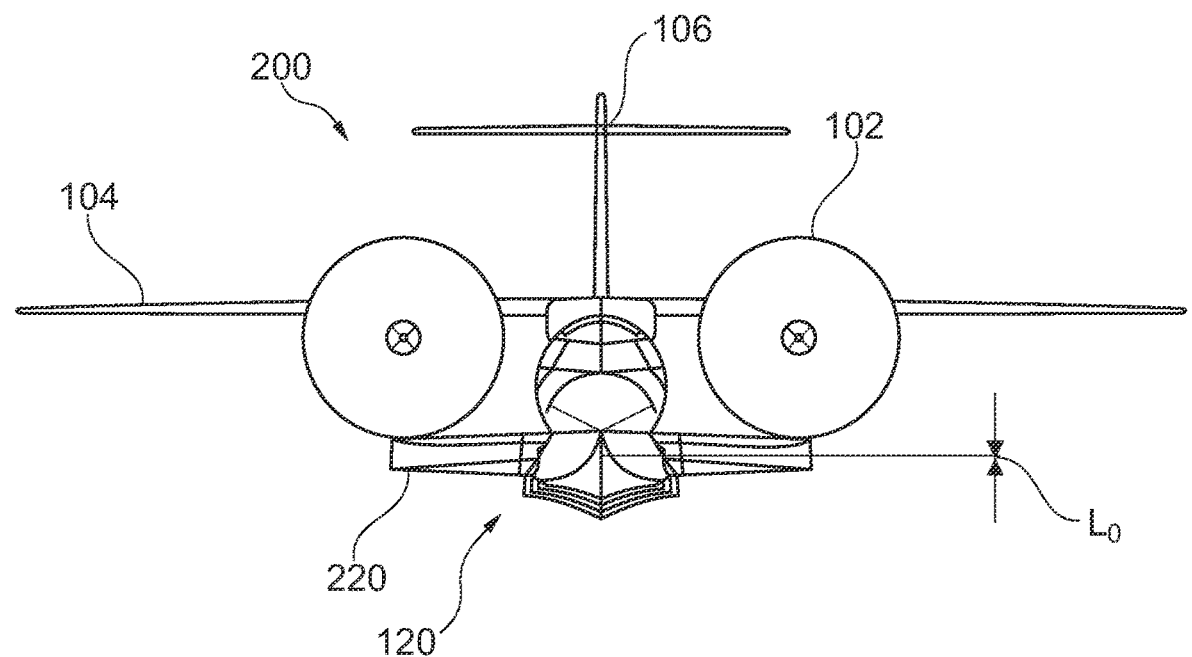

FIG. 2A and FIG. 2B show an aircraft 200 in a schematic front view. The embodiment of the aircraft 200 shown in FIGS. 2A and 2B comprises the components of the embodiment of the aircraft 100 shown in FIG. 1. For reasons of clarity, only the differences to the embodiment described in FIG. 1 are explained below.

In the embodiment of FIG. 2A and FIG. 2B the floating device 120 comprises a distance setting device. With the distance setting device a distance of at least a part of the floating device 120 with respect to the fuselage 110 can be set. The distance setting device is explained still more in detail in the following paragraphs.

In FIG. 2A a distance $L_1$ between the floating device 120 and the fuselage 110 is adjusted via the distance setting device. The distance $L_1$ can, for example, be selected in such a manner that the distance of the engine units 102 to the waterline during takeoff is large enough. This means that the distance $L_1$ can, for example, be selected in such a manner that as little splash water as possible gets to the engine units 102.

In FIG. 2B a distance $L_0$ is adjusted between the floating device 120 and the fuselage 110 via the distance setting device. The distance $L_0$ is smaller than the distance $L_1$ shown in FIG. 2A. A smaller distance between the floating device 120 and the fuselage 110 has, for example, the advantage that the aircraft can comprise a lower aerodynamic resistance.

Furthermore, by adjusting a smaller distance $L_0$ an improved streamlined sophistication of the aircraft 200 can be achieved. This is in particular advantageous during the flight of the aircraft 200, since in this manner properties of the aircraft, such as, for example, fuel consumption, maximum speed and flight behavior can be optimized.

In advantageous embodiments of the aircraft 200 with the distance setting device described above the floating device 120 comprises a shape conforming itself to the fuselage 110. In FIG. 2B the floating device 130 conforms itself to the fuselage 110 of the aircraft 200. The distance between the floating device 120 and the fuselage 110 due to the conforming shape can be adjusted to a minimum distance $L_0$. Typically the inside of the floating device 120 facing the fuselage 110 has a substantially complementary shape to the shape of the fuselage 110. As is shown in FIG. 2B, the floating device 130 encompasses the fuselage 110.

The distance $L_1$ described above and shown in FIG. 2A is typically a configuration adjusted via the distance setting device during operation of the aircraft on water. This means that for takeoff and/or landing on water the aircraft 200 is typically in this configuration.

The minimum distance $L_0$ shown in FIG. 2B is typically a configuration of the aircraft 200 during flight. For example, the distance $L_1$ adjusted during takeoff, which is advantageous for takeoff, after takeoff of the aircraft 200 can be adjusted via the distance setting device to the distance $L_0$ which is advantageous during the flight of the aircraft 200.

Optionally the floating device 120, which is shown in FIGS. 2A and 2B, comprises sponsons 220 on both sides of the floating device 120. The sponsons 220 are typically adapted to increase the stability of the aircraft during operation on water. In particular the sponsons 220 can serve as a work platform and/or as a rescue platform.

Furthermore, the sponsons 220 can increase the lift of the floating device 120 so that, for example, the weight of the aircraft 200 can likewise be increased up to the MTOW (maximum takeoff weight).

Figure 3:
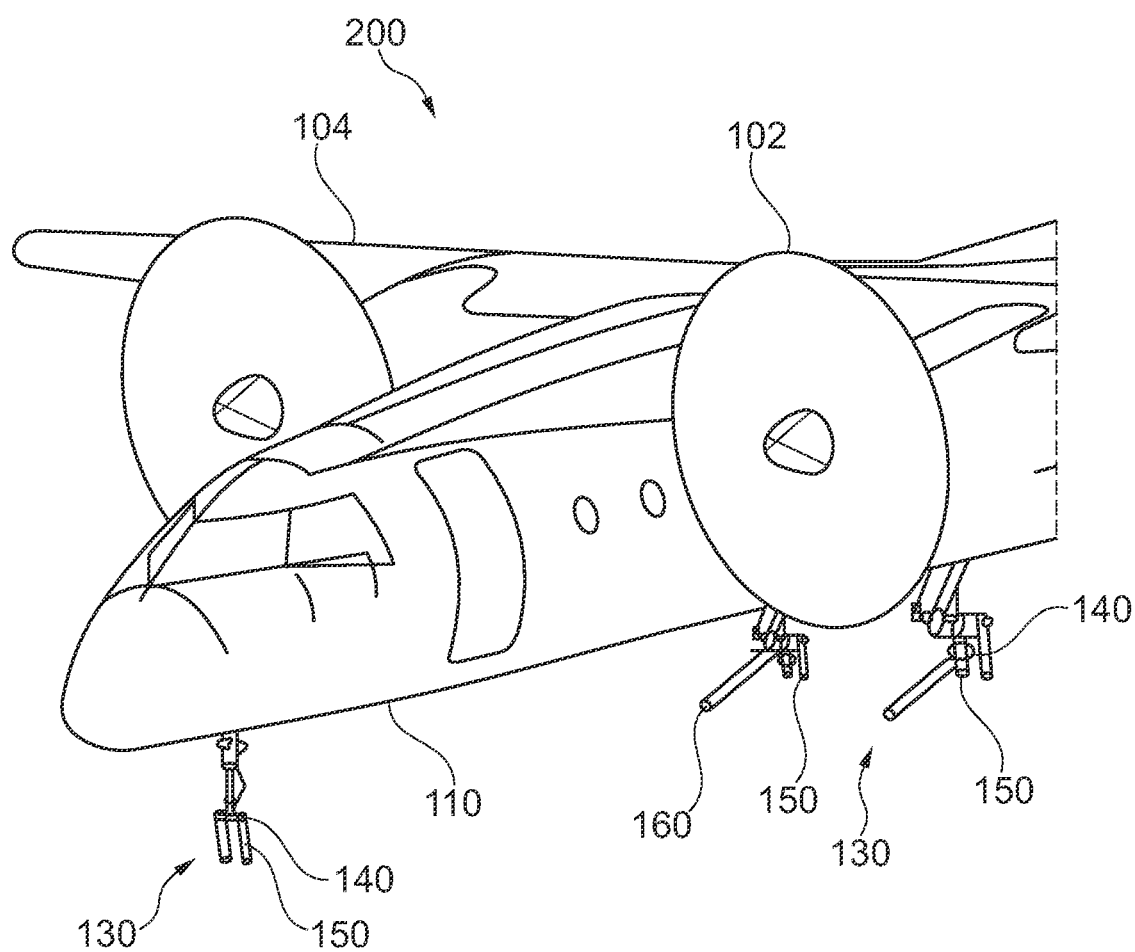
FIG. 3 shows a schematic side view of an aircraft with unassembled floating device according to the second embodiment.

FIG. 3 shows a schematic side view of the aircraft 200. In FIG. 3 the aircraft 200 is shown without the floating device described above. As is described above, the floating device can be coupled to the landing gear 130 via a connecting device 140. The connecting device 140 comprises in FIG. 3 a distance setting device 150.

The distance setting device 150 is realized in the embodiment shown in FIG. 3 as straps attached on the respective connecting device 140. The straps can be realized as a Z-axis connection. The length of the straps is typically approximately half of the lowering height of the floating device. The lowering height of the floating device is typically determined as the difference between a maximum distance $L_1$ and a minimum distance $L_0$ between the floating device and the fuselage. In particular, the straps are freely rotatable around the axes of the landing gear 130.

In an extended condition the straps point downwards, as is shown in FIG. 3. In an extended condition a floating device coupled to the connecting device 140 and to the distance setting device 150 would be in a lowered condition. In an retracted condition the straps point upwards. In the lowered condition a floating device coupled to the connecting device 140 and the distance setting device 150 would be in a retracted condition in which it conforms itself to the fuselage 110 of the aircraft 200.

Typically, the straps can transfer Z-loads in extended condition. The loads in Z-direction transferred to the structural points of the aircraft can be limited by the dampers integrated into the landing gear 130.

Furthermore, the connecting device 140 can comprise an X-axis connection 160.

Moreover, in typical embodiments the floating device comprises one or more damping elements, wherein the respective damping element are substantially oriented in X-direction and/or substantially in Y-direction. The damping elements typically connect the floating device with the main landing gears of the aircraft. The damping elements can in particular be connected with the landing gear axes of the landing gear. By the damping elements oriented in X-direction, for example, forces in X-direction in permissible order of magnitude can be transferred to the landing gears. By the damping elements oriented in Y-direction accordingly forces in Y-direction in permissible order of magnitude can be transferred to the landing gears. Typically, the damping capacity of the damping elements can be selected according to the loads to be expected and/or the loads to be limited on the respective aircraft.

Figure 7A:
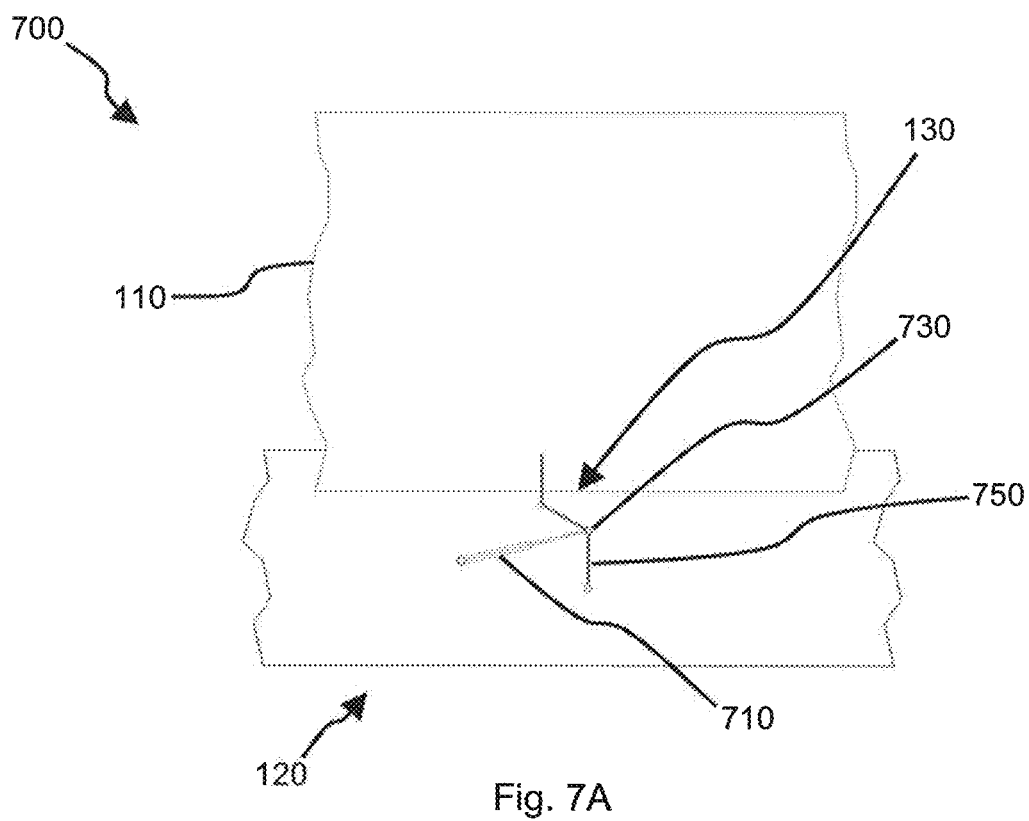
FIG. 7A and FIG. 7B show in a schematic view a portion of an aircraft with a floating device and a damping in X-direction according to an embodiment.
Figure 7B:
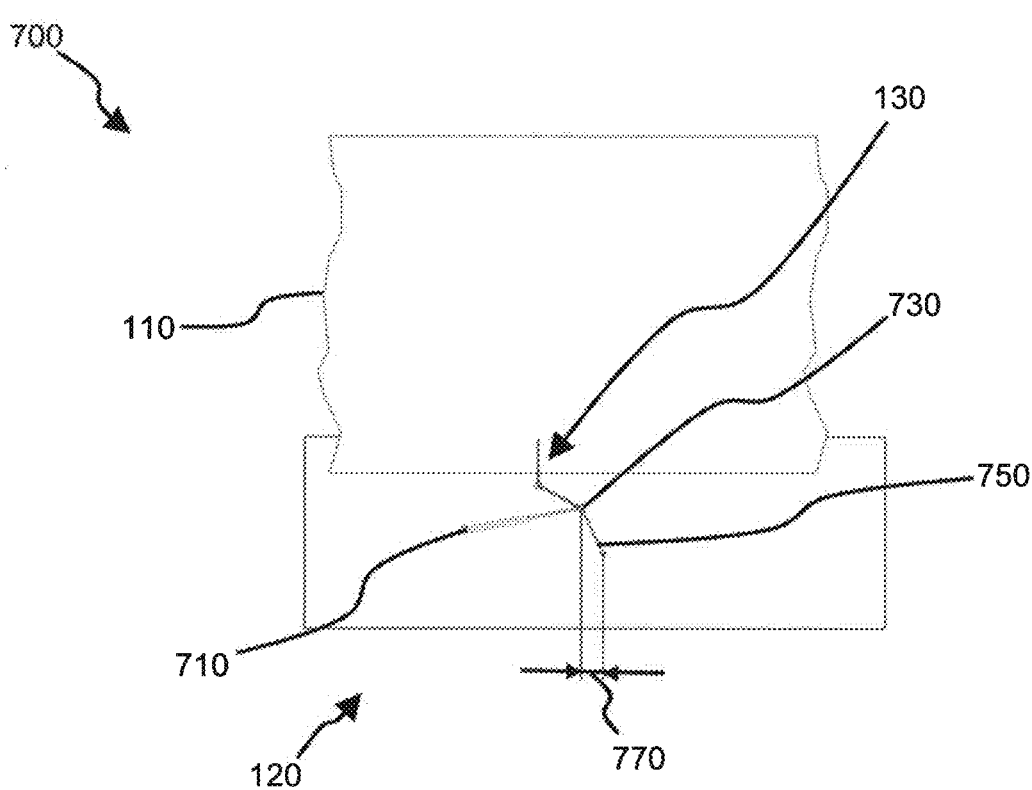

FIG. 7A and FIG. 7B show in a side view a schematic arrangement of a damping in X-direction (in the direction of the longitudinal axis) which can be used in another embodiment of an aircraft 700 with a landing gear 130 and a floating device 120. For better presentability only one segment of a fuselage 110 of the aircraft 700 and only one segment of the floating device 120 is shown. Furthermore, in FIGS. 7A and 7B only one landing gear leg of a main landing gear is shown. The landing gear 130 comprises landing gear axes, wherein for each landing gear leg typically a landing gear axis 730 is provided.

The floating device 120 comprises in FIGS. 7A and 7B hinged supports coupled to the floating device 120. For each landing gear leg of the main landing gear typically one hinged support 750 is provided. In FIGS. 7A and 7B one end of the hinged support 750 is connected with the floating device 120. The other end of the hinged support 750 is connected with the landing gear axis 730 of the landing gear 130. The hinged support 750 can in particular be realized in such a manner that rotating and/or lateral movements are possible. For example, the bearings of the hinged support 750 can be realized as a ball joint.

The reference numeral 770 in FIG. 7B characterizes an offset which occurs by a relative movement in X-direction of the floating device 120 with respect to the fuselage 110 of the aircraft 700. The offset 770 is achieved by the movable connection of the hinged support 750 with the floating device 120 and the landing gear axis 730. For the damping of forces in X-direction the floating device 120 comprises damping elements in FIGS. 7A and 7B which are connected with the floating device 120.

In FIGS. 7A and 7B a damping element 710 is connected at one end with the floating device 120. The other end of the damping element 710 is connected with the axis 730 of the landing gear 130. In particular, in this embodiment the damping element 710 can be realized as a hydropneumatic cylinder. The hydropneumatic cylinder can, for example, comprise a centering force or a return force in a standard position, such as, for example, in a position without considerable external force on the hydropneumatic cylinder. By the centering force or return force the floating device 120 can, for example, be centered relative to the aircraft structure, such as, for example, relative to the fuselage 110.

A force acting on the floating device 120 in X-direction via the damping element 710 in connection with the hinged supports 750 described above can be converted into a dampened movement of the floating device 120 with respect to the fuselage 110 of the aircraft 700 in X-direction. This means that the force acting in X-direction can be dampened and loads acting in X-direction on the aircraft structure can be limited.

Typically, the damping element 710 is adapted in such a manner that the dampened movement occurs only when a given force is exceeded. This can be achieved, for example, by a suitable selection of the centering force or the return force of the damping element 710.

The attenuation described above by means of the FIGS. 7A and 7B can be realized in typical embodiments for each landing gear leg of a landing gear, such as, for example, for a main landing gear with two landing gear legs and for a nose landing gear with one landing gear leg. In this embodiment each landing gear leg has a damping element allocated to the landing gear leg for damping in X-direction.

In other typical embodiments a load-synchronization-kinematics is connected with two or more landing gear legs. The load-synchronization-kinematics is typically adapted to distribute the loads onto the landing gear legs connected with the synchronization-kinematics substantially in a uniform manner. Via the load-synchronization-kinematics a damping element can provide the damping in X-direction for the several landing gear legs connected with the load-synchronization-kinematics.

Figure 8A:
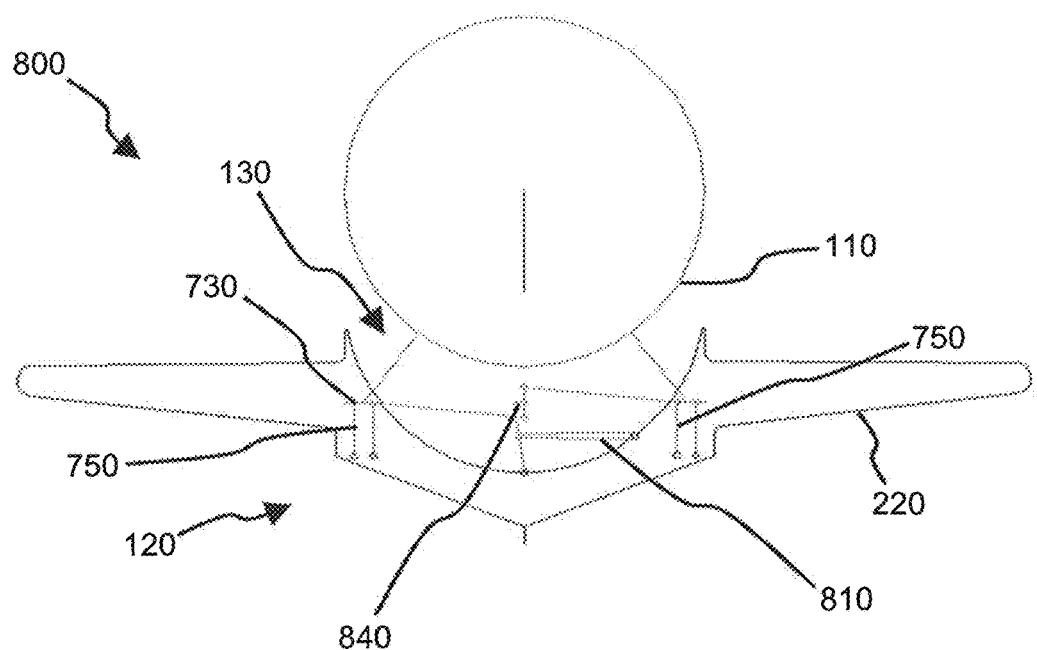
FIG. 8A and FIG. 8B show in a schematic cross-sectional view an aircraft with a floating device and a damping in Y-direction according to an embodiment.
Figure 8B:
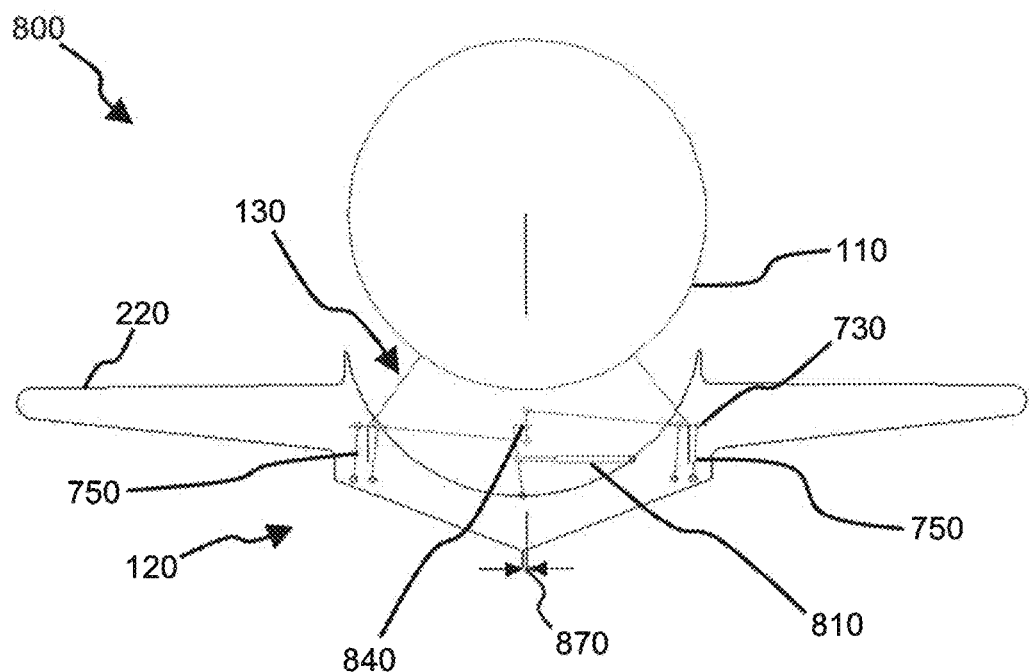

FIG. 8A and FIG. 8B show in a cross-sectional view a schematic arrangement of a damping in Y-direction (in the direction of the transverse axis) which can be used in a further embodiment of an aircraft 800 with a landing gear 130 and a floating device 120. For a damping in Y-direction a damping element 810 is oriented substantially in Y-direction. The damping element 810 can be realized similar to the damping element 710 of FIGS. 7A and 7B described above.

In FIGS. 8A and 8B only the two landing gear legs of a main landing gear are shown. The floating device 120 comprises hinged supports 750 for each one of the two landing gear legs. One end of a respective hinged support 750 is in each case connected with the floating device 120 via a coupling point of the floating device 120. The other end of a respective hinged support 750 is in each case connected with one of the landing gear axes 730 of the main landing gear. The hinged supports 750 can be realized similar to the hinged supports described in FIGS. 7A and 7B.

One end of the damping element 810 is connected with the floating device 120. The other end of the damping element 810 is connected with a load-synchronization-kinematics 840. The load-synchronization-kinematics 840 typically comprises a connection mechanism between the landing gear legs of the main landing gear, the damping element 810 and the floating device 120. In particular, the load-synchronization-kinematics 840 is adapted to distribute loads substantially in a uniform manner onto the landing gear legs connected with the load-synchronization-kinematics 810. In said embodiment by the load-synchronization-kinematics 840, for example, only one damping element 810 can be used for the damping of forces in Y-direction for both landing gear legs of the main landing gear.

In particular, it can be provided in the embodiment described in FIGS. 8A and 8B that the load-synchronization-kinematics 840 immerges into the landing gear shaft of the main landing gear. In the case of a floating device, which conforms itself to the fuselage 110 of the aircraft, a possible impediment to the adjusting movement in Y-direction by the floating device can thus be avoided.

For damping in Y-direction in the embodiment of FIGS. 8A and 8B the nose landing gear not shown in FIGS. 8A and 8B can be equipped with a damping element connected directly with the landing gear axis of the nose landing gear.

The reference numeral 870 in FIG. 8B characterizes an offset which occurs by a relative movement in Y-direction of the floating device 120 with respect to the fuselage 110 of the aircraft 800. The offset 870 is achieved by the movable connections of the hinged supports 750 with the floating device 120, the load-synchronization-kinematics 810 and the landing gear axes 730. A force acting on the floating device 120 in Y-direction via the damping element 810 in connection with the hinged supports 750 described above and the load-synchronization-kinematics 810 can be converted into a dampened movement of the floating device 120 with respect to the fuselage 110 of the aircraft 800 in Y-direction. This means that the force acting in Y-direction can be dampened and loads on the aircraft structure acting in Y-direction can be limited.

The embodiments of a damping in X-direction and/or a damping in Y-direction described by means of the FIGS. 7A and 7B and the FIGS. 8A and 8B can be combined with each other so that in another embodiment a damping not only in X-direction but also in Y-direction can be achieved.

Figure 4:
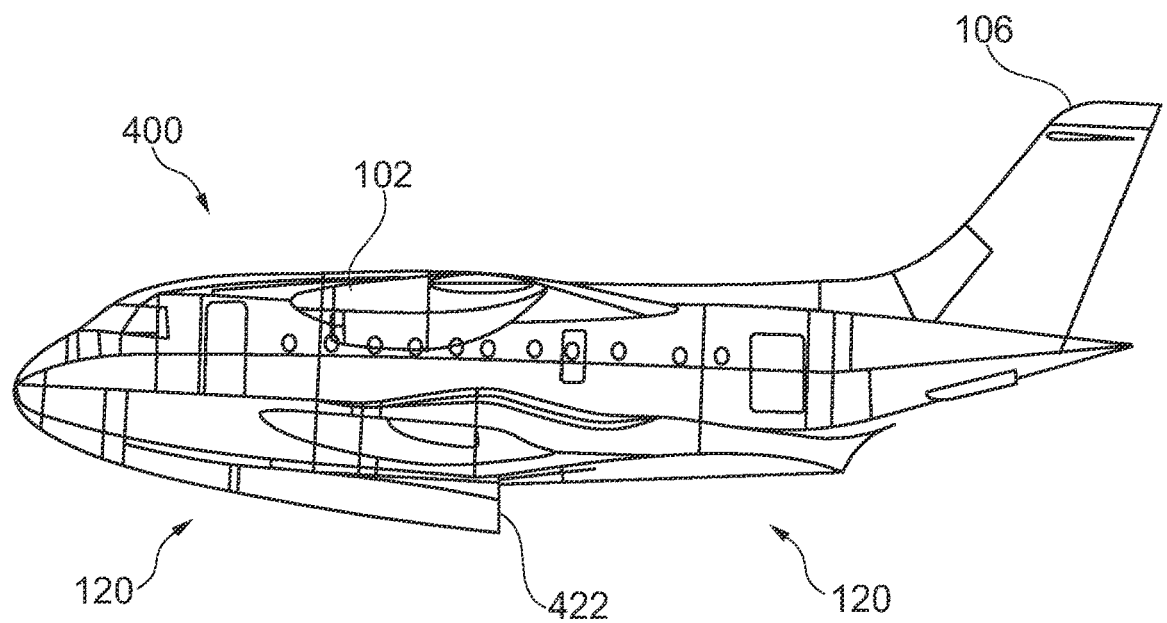
FIG. 4 shows a schematic side view of an aircraft with a floating device comprising a step according to a third embodiment.

FIG. 4 shows a side view of an aircraft 400 of another embodiment of the present disclosure. The aircraft 400 and the floating device 120 are realized similar to one of the embodiments described above of FIG. 1 or FIGS. 2A and 2B, except for the step 122 of FIG. 1. In addition, the floating device 120 of the aircraft 400 comprises a lowering element 422. The lowering element 422 replaces the function of the step 122 shown in FIG. 1.

The lowering element 422 can, for example, be retracted in a flight configuration, wherein it substantially ends flush with the lower boat structure of the floating device 120. A retracted lowering element 422 can in particular improve the aerodynamic profile of the aircraft 400. In a take off configuration the lowering element 422 can be extended and/or lowered in order to facilitate take off of the aircraft 400 from the water surface.

Typically, the lowering element 422 can be lowered and retracted via a suitable actuator, such as, for example, a controllable electric motor or a hydraulic or pneumatic actuator. The actuator is typically controllable via an on-board electrical system of the aircraft 400.

Figure 5:
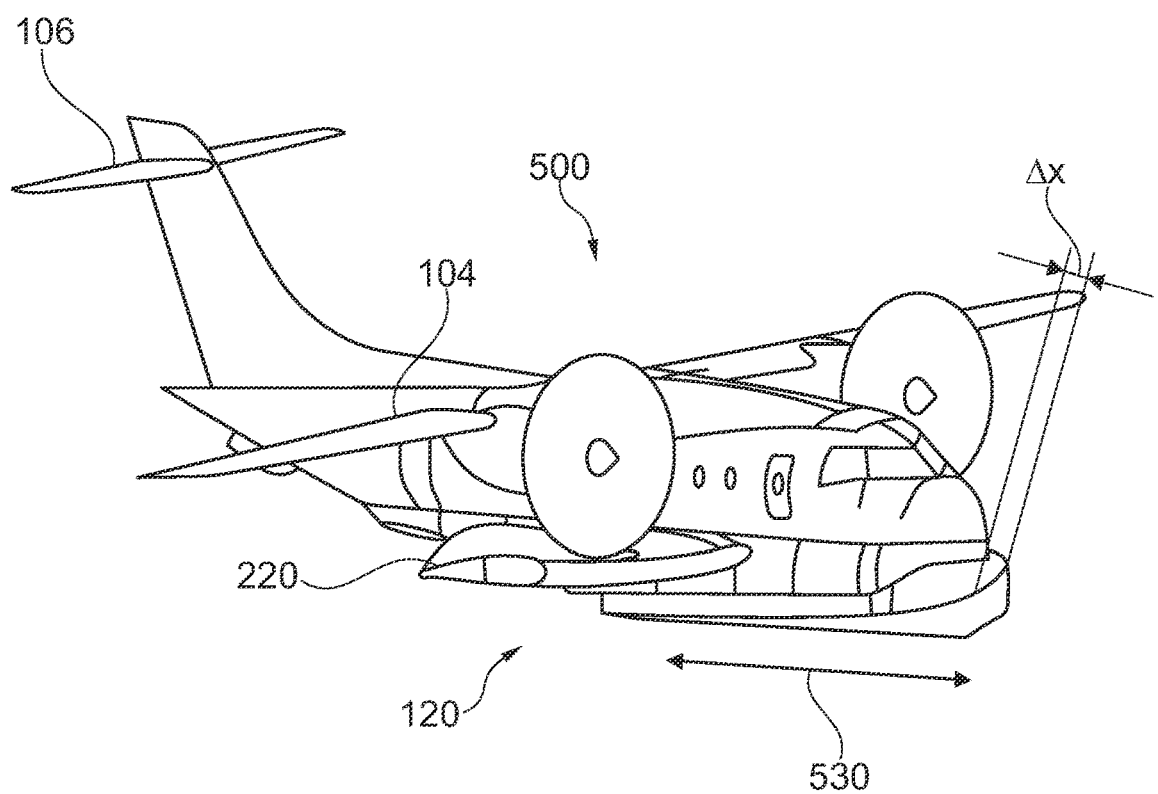
FIG. 5 shows a schematic perspective view of an aircraft with movable floating device according to a fourth embodiment.

FIG. 5 shows an aircraft 500 according to an embodiment of the present disclosure. The aircraft 500 comprises the components of the embodiment of the aircraft described above in FIG. 1. Moreover, the floating device 120 comprises damping elements. The damping elements typically connect the floating device 120 with the landing gear of the aircraft. The damping elements are typically adapted to transfer loads in X-direction in a permissible order of magnitude on the landing gears.

Furthermore, the floating device 120 can be moved via the damping elements of the embodiment shown in FIG. 5 along the X-axis and/or the longitudinal axis of the aircraft 500. The reference numeral 530 characterizes in FIG. 5 the shifting device along the X-axis. Shifting typically occurs via a suitable device which cooperates with the damping elements.

As is shown in FIG. 5, the floating device 120 can, for example, be shifted forward, this means, beyond the nose. In FIG. 5, the reference numeral Δx characterizes the shifting path. By the floating device 120 shiftable via the damping elements in X-direction, for example, the floating device can be shifted relative to the center of gravity of the aircraft. By this, for example, the hydrodynamic behavior of the aircraft 500 during takeoff and/or landing can be optimized.

Figure 6A:
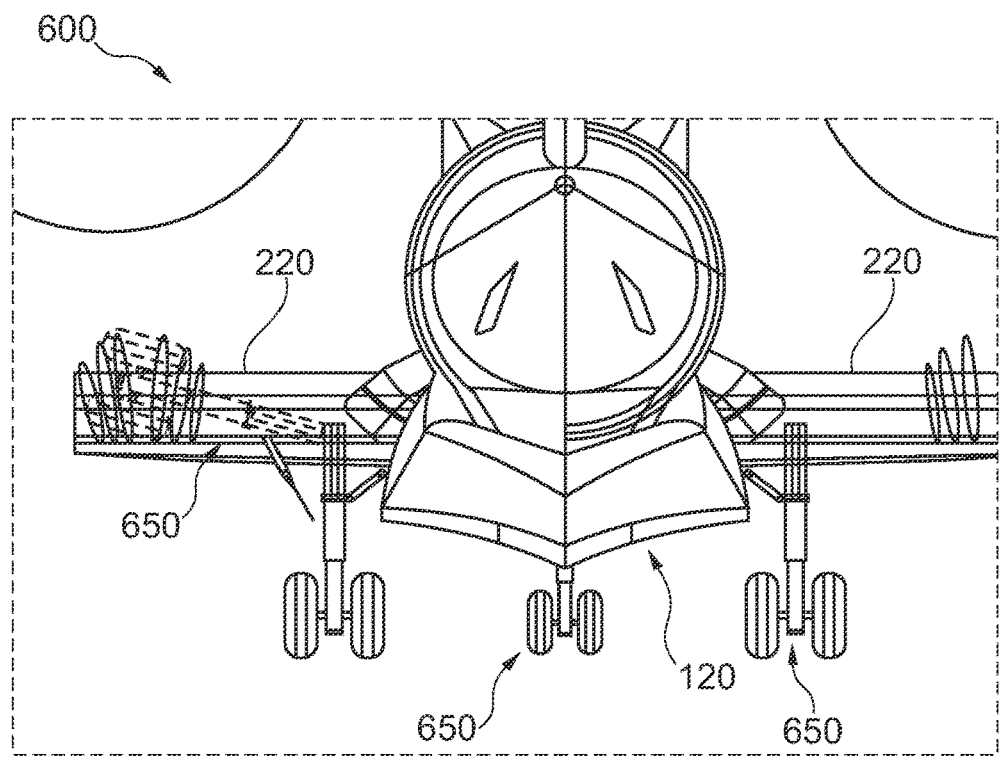
FIG. 6A shows a schematic rear view and FIG. 6B shows a schematic bottom view of an aircraft with a landing gear integrated into the floating device of an aircraft according to a fifth embodiment.
Figure 6B:
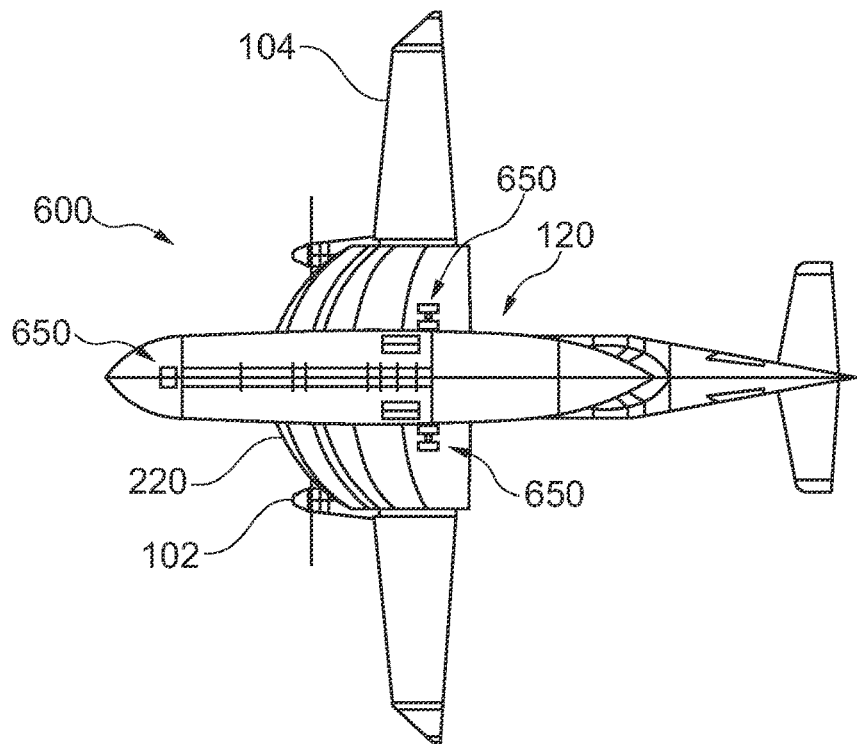

FIG. 6A and FIG. 6B show another embodiment of an aircraft 600 according to the present disclosure. The aircraft 600 comprises in addition to the embodiments described above a landing gear 650 integrated into the floating device 120. The landing gear 650 is configured in such a manner that the aircraft 600 can land and/or takeoff on land with extended landing gear 650. In particular, the main landing gear of the landing gear 650 can be integrated into the sponsons 220 of the floating device 120.

The landing gear 650 is typically realized as a retractable landing gear or foldup landing gear and typically comprises known retraction and extension systems for retractable landing gears and/or fold-up landing gears. In the case of a retracted landing gear 650 the main landing gear is accommodated in the sponsons 220 of the floating device 120. The nose landing gear is accommodated in the front section of the floating device 120. For this, the floating device 120 and/or the sponsons 220 of the floating device 120 comprise corresponding landing gear shafts. Typically, the landing gear shafts can be sealed off in a watertight manner when the landing gear is retracted. The sealing occurs, for example, via dampers sealable in a watertight manner.

When the landing gear 650 is retracted, the aircraft 600 can take off from and/or land on water. When the landing gear 650 is extended, the aircraft 600 can take off and/or land on land, that means on a runway on firm ground. Hence, the aircraft 600 can be operated as an amphibious aircraft.

Whereas the above refers to embodiments of the disclosure, further embodiments can be derived from the present disclosure without departing from the substantial scope of protection, wherein the scope of protection is determined by the patent claims given below.

The invention claimed is:

1. An aircraft for takeoff and landing on water or land comprising a fuselage;
a spring-mounted landing gear comprising two or more landing gear legs on which landing gear wheels for takeoff and landing on land are mountable; and
a single floating device coupled to the spring-mounted landing gear of the aircraft via a connecting device,
wherein the floating device is configured such that a hydrostatic lifting force of the floating device is greater than a maximum takeoff weight of the aircraft,
wherein the connecting device comprises a load-synchronization-kinematics, said load-synchronization-kinematics configured to distribute loads onto the two or more landing gear legs in a uniform manner, wherein the load-synchronization-kinematics comprises a synchronization lever to equally distribute a side load to the floating device to the two or more landing gear legs in a synchronized and damped way.

2. The aircraft according to claim 1, wherein the connecting device comprises a distance setting device adapted to set a distance of at least a part of the floating device with respect to the fuselage.

3. The aircraft according to claim 2, wherein the floating device is adapted to conform itself to the fuselage at least partly or at least substantially at a minimum distance set with the distance setting device.

4. The aircraft according to claim 1, wherein the spring-mounted landing gear and/or the floating device comprises a damping element.

5. The aircraft according to claim 1, wherein an inside of the floating device facing the fuselage comprises a substantially complementary shape to an undersides of the fuselage.

6. The aircraft according to claim 1, wherein the floating device comprises a substantially streamlined shape with a step.

7. The aircraft according to claim 1, wherein axes of the spring-mounted landing gear of the aircraft are coupleable to the floating device via the connecting device.

8. The aircraft according to claim 2, wherein the distance setting device is configured to allow relative movements between the aircraft and the floating device at least in X and Y-directions.

9. The aircraft according to claim 1, wherein the spring-mounted landing gear is connected with the floating device via hinged supports.

10. The aircraft according to claim 2, wherein the distance setting device comprises a damping element, wherein the damping element is adapted to compensate the loads during takeoff and/or landing.

11. The aircraft according to claim 10, wherein the damping element is configured such that the floating device can be moved along a longitudinal axis of the aircraft.

12. The aircraft according to claim 10, wherein the damping element is configured such that the floating device can be moved along a transverse axis of the aircraft.

13. The aircraft according to claim 1, wherein the floating device is equipped with the landing gear wheels for amphibious operation.

14. The aircraft according to claim 13, wherein the floating device is coupled to the spring-mounted landing gear of the aircraft exclusively via the connecting device.

15. A method for converting an aircraft into a seaplane, wherein the method comprises:

coupling a single floating device to two or more landing gear legs of a landing gear of the aircraft via a connecting device;

adjusting a distance of least a part of the floating device with respect to a fuselage of the aircraft via a distance setting device of the connecting device; and connecting a load-synchronization-kinematics comprised in the connecting device with the two or more landing gear legs to distribute the loads onto the one or more landing gear legs in a uniform manner, wherein the load-synchronization-kinematics comprises a synchronization lever to equally distribute a side load to the floating device to the two or more landing gear legs in a synchronized and damped way.

16. The method according to claim 15, further comprising an adjustment of the distance so that the floating device conforms itself at least partly to the fuselage or conforms itself at least substantially to the fuselage of the aircraft.

17. The aircraft according to claim 1, wherein the floating device and the spring-mounted landing gear are used for takeoff and landing of the aircraft on water and/or on land.

18. The method of claim 15, further comprising using the floating device and the landing gear for takeoff and landing of the aircraft on water and/or on land.

19. The aircraft of claim 4, wherein the damping element comprises one or more of a suspension element, a buffer element, a shock absorber, a gas spring, a hydraulic cylinder, or a hydropneumatic cylinder.

* * * * *